Figure 3:
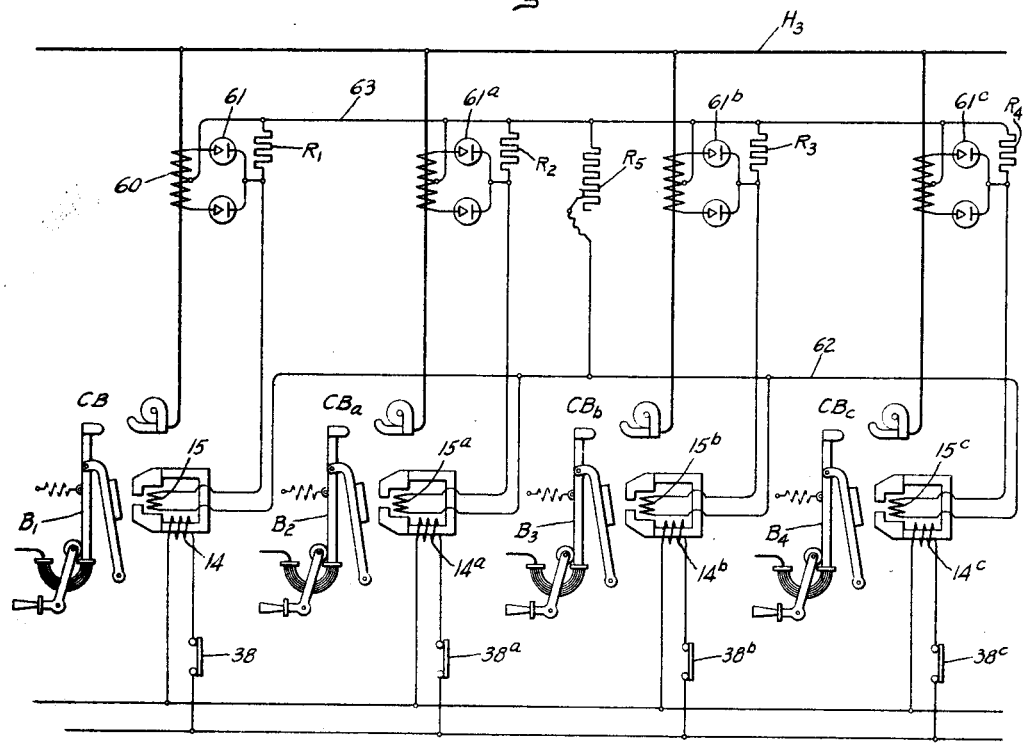

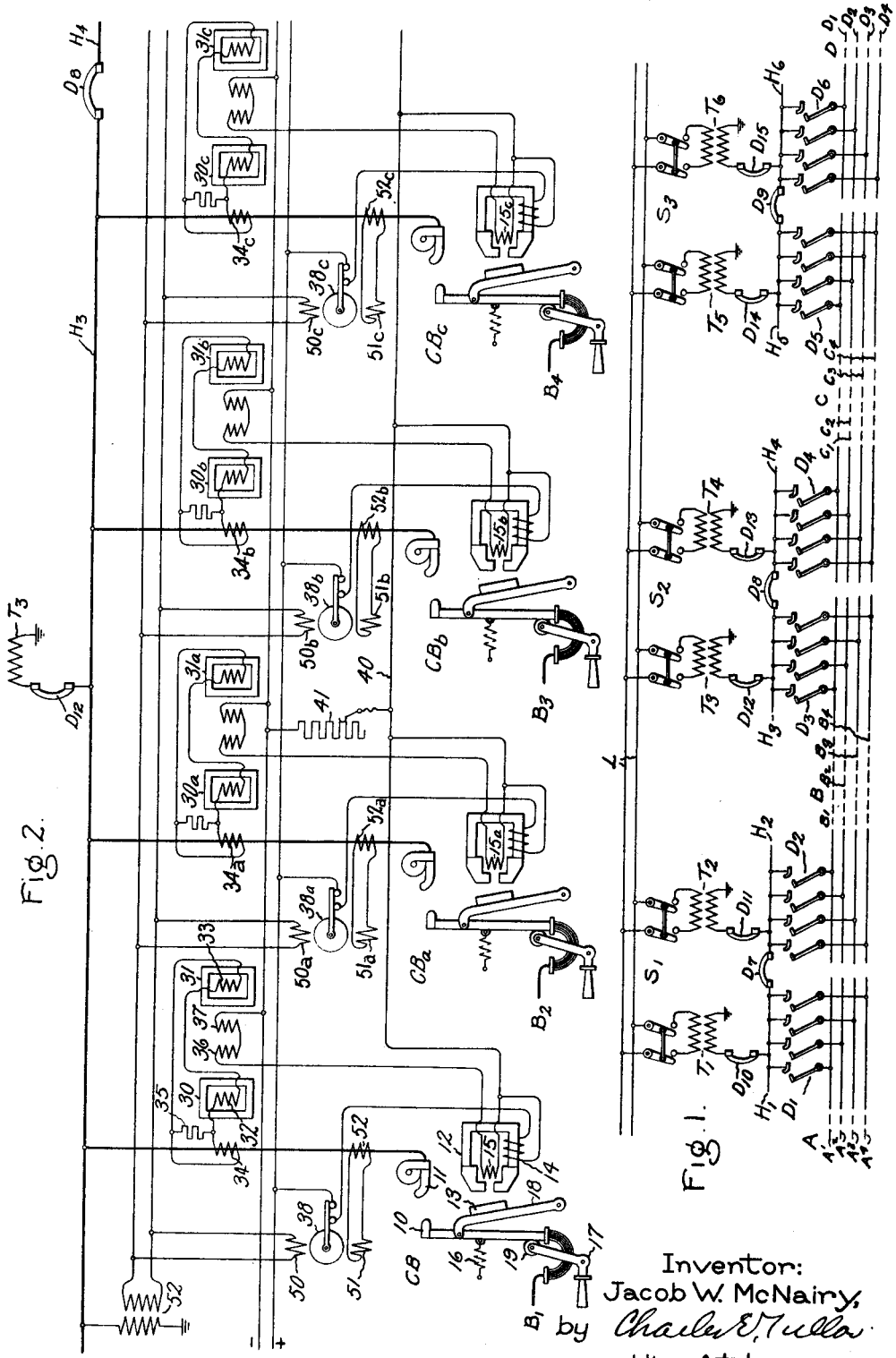

Sept. 22, 1931. J. W. McNAIRY 1,824,728
ELECTRORESPONSIVE DEVICE AND SYSTEM
Filed June 22, 1928 2 Sheets-Sheet 2

Inventor:
Jacob W. McNairy,
by Charles E. Mullan
His Attorney.

Patented Sept. 22, 1931

1,824,728

UNITED STATES PATENT OFFICE

JACOB W. McNAIRY, OF ERIE, PENNSYLVANIA, ASSIGNOR TO GENERAL ELECTRIC COMPANY, A CORPORATION OF NEW YORK

ELECTRORESPONSIVE DEVICE AND SYSTEM

Application filed June 22, 1928. Serial No. 287,540.

This invention relates to electroresponsive devices and systems for the selective control of network distribution systems, particularly alternating current network systems in which a plurality of feeder circuits are connected in parallel relation between supply sources or substations so that power may be fed to each feeder directly from the source at either end or through the other feeders in case of failure of any source.

With a network distribution system of this character it is highly desirable that in case any particular feeder becomes short-circuited so as to produce a sudden abnormally large and dangerous flow of current thereto, the faulty feeder should be isolated from the system as rapidly as possible without interrupting the current supply to the other feeders. Likewise, where there is a sudden excessive flow of current to more than one of the feeders or all of the feeders due to short circuit or other fault, all of the faulty feeders should be disconnected from the power supply system. In addition, provision should be made to take care of gradually increasing overloads in the feeders, as well as short circuits and other faults at the several sources or substations to insure continuity of service in the system.

One of the principal objects of the present invention is to provide an improved arrangement and connection of electroresponsive protective apparatus whereby such selective control of the feeder system and supply sources therefor may be obtained.

Although not necessarily limited thereto, the present invention is particularly advantageous in connection with the protection of alternating current feeder systems for multi-track electrified railways. In such systems power ordinarily is supplied by high voltage transmission lines and transformer substations are located at suitable intervals along the railroad for transforming the high voltage power to a lower voltage suitable for the overhead trolleys or third rail power supply conductors for the electric locomotives and cars of the railroad. Where a four track railroad system is involved and single phase power is supplied to the electric locomotives or cars from an overhead trolley system with a common grounded rail return circuit, there ordinarily are four trolleys to be fed from each transformer substation along the line. In order to localize trouble due to grounding of the trolleys, it is desirable that each of the four trolleys be sectionalized at each substation. That is, provision should be made for separately disconnecting the trolley feeders running each way from a common supply bus at each substation in case a fault develops on any portion or all of the trolleys in any section without disturbing power flow to adjacent interconnected sections of the trolley. My present invention is particularly applicable to provide selective protection for the trolleys in such a system.

Briefly, the protective system of the present invention provides the following protection in such a system. When a sudden fault develops in any section of trolley due to grounding or short circuiting, each end of the faulty trolley section is disconnected at each of the adjacent substations. In case more than one trolley or all the trolleys develop such a fault in any section, all of the faulty trolley sections are quickly disconnected at the adjacent substations without disturbing the power flow in the other feeders or in adjacent trolley sections. Moreover, in case of internal faults at any substation the feeders are maintained connected to the adjacent substations and are disconnected from the faulty substation only in the event the fault can not be cleared by opening other circuits at the substations.

In carrying the present invention into effect in a single phase alternating current trolley feeder protective system of the above character advantage may be taken of the action of the unidirectional transformer tripping circuit arrangement described and claimed in my copending application Serial No. 89,247, filed February 18, 1926. Briefly, this transformer tripping circuit arrangement provides a unidirectional tripping impulse upon a rapid increase of current in an alternating current circuit. In accordance with the present invention the ends of the four parallel trolley feeder circuits sectionalized at each substation may be protected by circuit breakers each provided with such a unidirectional transformer trip circuit with the transformer trip circuits differentially interconnected so as to provide the selective protection outlined above. The differential arrangement is such that the unidirectional current supplied by the transformer trip circuit of a faulty trolley feeder serves not only to trip out quickly the disconnecting circuit breaker therefor, but also assists in preventing the tripping of the unimpaired trolley feeders in the section. Moreover, when more than one, or all, of the trolley feeders in a section simultaneously develop short circuits at exactly the same instant the differentially interconnected transformer trip circuits function to disconnect the trolley feeders but at a higher value of current in each feeder than when the short circuit occurs in only one feeder. That is, where a certain percentage increase in current will effect the tripping of the disconnecting circuit breaker for one feeder, when faults develop on two or more feeders at exactly the same time, the percentage of current increase required to effect tripping of each breaker is automatically and progressively increased as the number of feeders developing faults at exactly the same instant increases. Moreover, by means of the present invention the percentage increase of current required for tripping the breakers individually as well as simultaneously may be adjusted at will. This automatic increase of tripping current for a plurality of feeder circuit breakers may be utilized to insure that in case of an internal short circuit at any substation the feeder circuits are not disconnected from the adjacent substations and furthermore are not disconnected from the faulty substation except in the case of a bus short circuit. In case of a bus short circuit, the differential unidirectional transformer trip circuits are designed to be ineffective and the feeder disconnecting switches may be operated under these conditions by suitable auxiliary relays such as standard incoming and outgoing bus current differential protective relays. This selective operation of the unidirectional tripping transformer circuit to differentiate between internal faults at the substation and faults on the feeder line is of the greatest advantage in maintaining continuity of service, as otherwise the power supplied to all feeders connected to a faulty substation would be interrupted with the usual forms of feeder protective systems.

In the drawings Fig. 1 is a diagram showing schematically a typical four track sectionalized railway feeder system of the above character involving a plurality of transformer substations; Fig. 2 is a diagram showing the detailed connection of the transformer trip circuits for the disconnecting switches at the ends of the four trolley feeders of each section at each substation; and Fig. 3 is a diagram showing a modified connection arrangement employing rectifiers for tripping the disconnecting switches.

In the schematic diagram of Fig. 1 power is supplied from the high voltage transmission line L to the several substations S1, S2, S3, which it will be understood are located at suitable intervals along the four track electrified railroad and arranged to feed the sections A, B, C, D, of the trolley or third rail system constituting the power supply conductors for the locomotive equipment. It will be understood that in accordance with the usual practice the feeders in each section A, B, C, D, are connected at frequent intervals to the individual trolleys or third rails associated with each of the four tracks involved, and the grounded rails of the track are utilized for the return circuit. In the power supply system indicated, the high voltage supply lines L are shown as single phase lines.

At the respective substations S1, S2, S3, suitable transformers T1 to T6 are provided for reducing the voltage of the current supplied from the line L to a value suitable for application to the trolley or third rail feeders from which the locomotive equipment is energized. As indicated schematically in the drawings one terminal of the low voltage side of each transformer is grounded to show that it is connected to the common rail circuit and the other low voltage terminal of the several transformers are connected to the corresponding substation busses $H_1$—$H_6$ respectively. In order to localize trouble due to grounding, or other faults on the feeder sections A, B, C, D, or in the several substations, the feeders are sectionalized at each substation and provision is made for individually disconnecting each end of the four feeders in each of the sections A, B, C, D, from the respective supply busses H1 to H6 by means of the corresponding groups of disconnecting switches D1 to D6. In addition, the pairs of busses H1 and 2, H3 and 4, H5 and 6, at the respective substations are arranged to be either connected together or separated by the respective disconnecting switches D7, 8 and 9. Likewise, the low voltage side of the transformers from which the respective busses are fed are disconnected therefrom by the disconnecting switches D10 to D15, which may be arranged to be operated under the control of suitable relays providing overload, under-voltage reverse power and other desired protection in accordance with standard practice. Furthermore, any suitable form of disconnecting switch for the high voltage side of the transformers may also be provided as indicated in the drawings. As the present invention is concerned primarily with the arrangement and connection of the groups of feeder disconnecting switches D1 to D6, no further detailed description of the transformer and bus disconnecting switches is deemed necessary. In accordance with the present invention the disconnecting switches in each of the groups D1 to D6 are arranged to operate individually to disconnect the corresponding feeder in case of an excessive increase of current therein such as would occur upon grounding of the feeder. Moreover, where faults on more than one feeder in any section occur at the same instant the corresponding disconnecting switches are arranged to operate upon a sudden increase in current but as previously pointed out the present invention insures that a greater percentage increase in current in each feeder is required in case a plurality of feeders are short-circuited at the same instant.

Fig. 2 diagrammatically shows the construction and connection arrangement of the groups of disconnecting switches D1 to D6 in accordance with a preferred form of the present invention. Thus at substation S2 the feeder bus H3 is supplied with power through transformer T3 from the high voltage transmission line L, as previously indicated. The trolley feeders B1, B2, B3, B4, at one end of the section B are supplied with power from the bus H3, through the circuit breakers CB, CBa, CBb, CBc, which constitute the group of disconnecting switches D3.

As shown diagrammatically in Fig. 2 of the drawing, each of these circuit breakers is of the high speed type described and claimed in the Tritle Reissue Patent No. 15,441, dated August 29, 1922, and also embodies the trip free feature of the Tritle Patent No. 1,560,440 of November 3, 1925. Briefly, this form of circuit breaker comprises a movable circuit controlling switch element 10 which is normally held in circuit closing engagement with the cooperating switch element 11 by the electromagnet 12 having the armature 13 mechanically connected with the movable switch element 10. The electromagnet 12 is provided with a holding winding 14 and a tripping winding 15, the holding winding 14 being normally energized from a suitable direct current source and the tripping winding 15 being arranged to effect the release of the armature 13 when energized with a unidirectional current in the manner described more fully hereinafter. The arrangement is such that the tripping winding 15 shifts the holding flux of the electromagnet 12 from the armature 13 across the air gap between the poles of the electromagnet 12 when the tripping winding 15 is energized with current in the proper direction.

A very rapid opening of the circuit breaker is accomplished by the spring 16 which strongly biases the movable switch element 10 to the circuit opening position. A suitable closing mechanism 17 is provided and is shown as of the manual type for the sake of clarity, although an electromagnetically operated mechanism ordinarily would be employed. The trip free characteristic of the circuit breaker is obtained as diagrammatically illustrated in the drawings by pivoting the movable switch member 10 upon the supporting arm 18 which carries the armature 13. In this way the operation of the roller 19 of the closing mechanism against the lower end of the switch element 10 sets up a strain in the biasing spring 16 and moves the armature 13 into engagement with the poles of the holding electromagnet 12 while still maintaining the switch element 10 out of engagement with the element 11. Upon release of the closing mechanism 17 the supporting arm 18 is maintained fixed by the holding electromagnet 12 and the biasing spring 16 swings the switch element 10 into engagement with the cooperating element 11 about its pivotal connection with the supporting arm 18. Each of the other circuit breakers CBa, CBb, CBc, is of similar construction.

The normally magnetized transformer tripping circuit arrangement for supplying unidirectional current to the tripping winding 15 of the circuit breaker in the proper direction to effect release thereof is of the type described and broadly claimed in my copending application Serial No. 89,247, filed February 18, 1926. As diagrammatically illustrated in Fig. 2 this transformer tripping arrangement comprises the two transformers 30 and 31 having their primary windings 32 and 33 connected to be energized in series from the current transformer 34 in the feeder line B1, which is controlled by circuit breaker CB. The transformer 34 may be a standard type of current transformer, and the transformers 30 and 31 also are of a similar type. The resistor 35 is connected across the terminals of the current transformer 34 in order to properly load the secondary circuit of this transformer so that the normal value of current in the secondary circuit thereof may be obtained. The secondary windings 36 and 37 of the pair of transformers 30 and 31 are connected reversely in series as indicated in the drawing to supply the unidirectional tripping impulse to the winding 15 of the circuit breaker CB. The normal magnetization of the magnetic circuits of the transformers 30 and 31 is obtained by energizing the secondary windings 36 and 37 of the transformers from the direct current supply source indicated as + and − in the drawings. The circuit for this normal transformer magnetizing current may be traced from the negative supply line through the transformer secondary windings 36 and 37, the tripping winding 15 and thence through the holding winding 14 and the contact of relay 38 to the positive line. Thus, the current in this circuit serves to normally energize both the holding electromagnet 14 and the magnetic structures of the transformers 30 and 31.

The normally magnetized tripping transformers and holding electromagnet for the other circuit breakers CBa, b, c, are constructed and arranged in precisely the same way as described in connection with the circuit breaker CB. However, it will be observed that an equalizing connection or bus 40 is connected between the tripping and holding winding of each of the four circuit breakers and that a balancing resistor 41, preferably of the adjustable type, as indicated in the drawings, is interconnected between the equalizing bus 40 and the negative supply line. Thus the equalizing bus and balancing resistor provide a common return path for the unidirectional tripping impulses supplied by all of the tripping transformers. Also the equalizing bus 40 serves to connect the secondary windings of each pair of tripping transformers, together with the tripping winding of the associated circuit breaker in differential circuit relation with the transformer secondary winding and circuit breaker tripping winding of each other circuit breaker. In tracing these differential circuits in Fig. 2, it will be noted that one differential circuit extends from the upper direct current supply line, indicated as −, through the secondary winding 37 of the transformer 31, the secondary winding 36 of the transformer 30, the tripping winding 15, and thence to the equalizing bus 40. A second differential circuit extends from the upper direct current supply line through the secondary windings of the transformers 31a and 30a, tripping winding 15a to the equalizing bus 40. A third differential circuit extends from the upper supply line through the secondary windings of the transformers 31b and 30b, the tripping winding 15b to the equalizing bus 40. A fourth differential circuit extends from the upper supply line through the secondary windings of the transformers 31c and 30c, the tripping winding 15c to the equalizing bus 40. Each of these differential circuits also is in multiple relation with a circuit including the balancing resistor 41 which extends from the upper supply line − to the equalizing bus 40. This differential tripping circuit arrangement permits the selective operation of the corresponding circuit breakers in case one or more or all of the feeder lines B1 to B4 should separately or simultaneously become short circuited or develop other serious faults producing a rapid increase in current therein in the manner now to be described.

As set forth in my previously mentioned application, Serial No. 89,247, the normal direct current magnetization of the cooperating pairs of tripping transformers, together with the reverse connection either of the secondary windings as shown or of the primary windings if desired, insures that a unidirectional current impulse is supplied to the tripping winding of the high speed circuit breaker upon the occurrence of a rapid increase of current in the primary winding of the tripping transformers. Thus, in case any one of the feeder lines B1 to B4 becomes short-circuited with a resulting rush of current therein, the corresponding one of the current transformers 34, 34a, 34b, 34c, immediately supplies a corresponding increase in current to the primary windings of the corresponding pair of tripping transformers.

Briefly, the production of the unidirectional current impulse in the secondary windings of the tripping transformers under these conditions is due to the fact that the increased primary current of the pair of tripping transformers tends to increase the magnetization of one of the transformers and decrease that of the other transformer. Thus, with the normal direct current magnetization of both transformers at a value near the bend in the saturation curve, a greater change in magnetization results in the particular transformer in which the primary winding tends to decrease the magnetization than in the other transformer.

This greater change of flux in the transformer having its magnetization decreased inherently induces a voltage in its secondary winding greater than that induced in the secondary winding of the other transformer. Consequently, the predominating secondary voltage is effective to supply a tripping impulse to the tripping winding of the corresponding circuit breaker. It should be noted that in case the short circuit and corresponding current rush in the feeder line occurs during either half cycle, a corresponding one of the pair of tripping transformers has a predominating voltage induced in the secondary winding thereof in the manner just described. Thus, the impulse supplied to the tripping winding of the circuit breaker is always in the same direction irrespective of the direction of the alternating current at the instant the short circuit on the feeder line occurs.

*Feeder short circuits*

With the differential connection between the transformer tripping circuits for the four feeder circuit breakers as illustrated in Fig. 2, the tripping impulse produced upon the rush of current in a short-circuited feeder by the pair of tripping transformers associated therewith flows in the direction to effect tripping of the corresponding circuit breaker but returns in the reverse direction through the tripping windings of the other circuit breakers and the balancing resistor in multiple. For example, when the feeder line B1 becomes short circuited, the pair of tripping transformers 30 and 31 function to supply the tripping impulse to the winding 15 in the proper direction to effect release of the armature 13 and thereby permit the movable contact 10 to quickly move to the circuit interrupting position thereby immediately disconnecting feeder B1 from the power supply bus at substation S2. After passing through the tripping winding 15 the circuit for the tripping impulse extends through each of the tripping windings 15a, b, c, and the secondary windings of the corresponding transformers and also through the balancing resistor 41 with all of these in multiple circuit relation. The loading resistors connected across the primary windings of the other tripping transformers serve effectively to lower the impedance of these transformers to the return tripping current. As previously pointed out, the return tripping current passing through the tripping windings 15a, b, c, is in the reverse direction from that required to effect release of the corresponding circuit breakers. In a similar manner the disconnecting circuit breaker in group H2 for feeder B1 operates to disconnect the short-circuited feeder B1 from the power supply bus at substation S1. It should be noted that with the high speed circuit breakers as illustrated the complete disconnection of the feeder occurs almost instantaneously upon the short-circuiting thereof, the action ordinarily requiring only one-half cycle in circuits of commercial frequency.

In case the short circuit occurs on any of the other feeder lines B2, B3, B4, the tripping transformers associated therewith function in the same manner to supply a tripping impulse in the proper direction to the tripping winding of the corresponding feeder disconnecting circuit breaker at each of the substations S1, S2, but in the reverse direction through the tripping windings of the remaining circuit breakers. Thus this differential connection of the transformer trip circuits insures that only the tripping winding of the circuit breaker for the faulty feeder is operatively energized while at the same time the tripping windings of the circuit breakers for the other parallel feeders are energized in the direction tending to maintain these feeder breakers closed.

In case a plurality of feeders develop short circuit faults at the same instant, tripping impulses are supplied to effect instant release of the corresponding feeder circuit breakers by the tripping transformers associated therewith. However, in this case, the number of parallel return paths for the tripping impulses necessarily is decreased directly as the number of feeder lines simultaneously developing faults increases. Thus with short circuits at the same instant on the feeder lines B1, B2, B3, the only return path for the tripping impulse is through the single remaining tripping circuit of the circuit breaker for the feeder B4 in parallel with the balancing resistor 41 since each of the pair of tripping transformers for the feeder lines B1, B2, B3 have equal active voltages induced in the secondary circuit thereof tending to send tripping current through the tripping windings of the corresponding circuit breakers to the equalizing bus 40. With the number of multiple return paths thus reduced, the value of the voltage induced in each transformer trip circuit necessary to supply the impulse required for effecting release of the corresponding circuit breaker is increased. Consequently, a greater current increase in each of the faulty feeders is required to effect simultaneous disconnection thereof from the bus B3 than is required to effect disconnection of a single faulty feeder.

When all of the feeders in any section develop short circuits at exactly the same instant, the only return path for the combined tripping impulses at each of the adjacent substations at the ends of the feeder sections is through the balancing resistor. In this case the maximum increase of current per feeder is required to produce sufficient current in the tripping windings to effect operation of all of the circuit breakers. By varying the value of the balancing resistor, the increase of current per feeder for simultaneous faults of a plurality of feeders may be adjusted at will with respect to the increase in current required to disconnect each feeder separately. As previously pointed out, this characteristic permits the tripping current required for operation of all the circuit breakers in case of internal substation short circuits to be made greater than the exchange current between substations while still capable of readily responding to separate or simultaneous short circuits of the feeders and in this way maintain continuity of service under all possible conditions. It will be understood that the bus and transformer disconnecting switches shown in Fig. 1 may be arranged in accordance with standard practice to be operated under the control of suitable overload relays, differential incoming and outgoing bus current relays or the like (not shown) to provide adequate protection for the substation apparatus and circuits upon the occurrence of internal faults at the substation such as bus short circuits, transformer short circuits or short circuits on the high voltage lines adjacent the substation. In this connection it should be noted that while not shown in the drawings it is desirable for insuring continuity of service that a plurality of high voltage lines be provided for independently supplying power to the transformers at each substation in case any one of the lines should fail. Thus two lines may be employed in the system shown in Fig. 1 with each of the two transformers at each substation connected to a different one of the lines.

If desired, the feeders B3 to B4 may be arranged to be disconnected from the substation bus B1 in case of a short circuit on the bus or other internal fault at the substation by means of the protective relays 38, 38a, 38b, 38c. These devices may be of the form indicated having a potential winding 50 and a current winding 51 with an induction disk armature arranged to actuate the relay contact in case of either failure of voltage on the substation bus B1 or excessive current flow through the feeder circuits connected thereto or a combination of these faults. To obtain this result the windings 50, 50a, 50b, 50c of the corresponding relays are connected to be energized from the potential transformer 52 and the current windings 51, 51a, 51b, 51c are separately energized from the current transformers 52, 52a, 52b, 52c, respectively.

Since the circuit of the holding windings 14, 14a, 14b, 14c of the feeder disconnecting circuit breakers are energized through the contacts of the respective relays 38, 38a, 38b, 38c, the opening of the contact of any one of these relays serves to deenergize the holding magnet of the corresponding circuit breaker and thereby permit operation thereof to the circuit opening position. Thus, the relays 38, 38a, 38b, 38c, provide for disconnecting the corresponding feeders B1 to B4 in case of short circuit of the substation bus H3 and also in case any one of the feeders carries a gradually increasing overload current, the increase being insufficient to produce operation of the transformer circuit breaker tripping circuits. In this way the transformer tripping circuits function to provide instantaneous release of the feeder disconnecting circuit breakers in case of short circuits on the feeder lines while the relays of the type shown produce operation of the feeder disconnecting circuit breakers in case of steadily increasing overloads. Likewise, other suitable relays, such as differential or reverse power relays, may be arranged to open the holding coil circuit in case of faults developing at the substation busses or in any of the transformer or high voltage line circuits. With this arrangement of protective apparatus at each substation let us assume that a short circuit occurs on the bus H2 at substation S1 in the system shown in Fig. 1. The protective relays associated with the disconnecting switches D7, D11, and possibly the disconnecting switches on the high voltage side of the transformer T2 at once start operation to disconnect the short-circuited bus H2 from the power supply. However, with proper adjustment of the balancing resistors associated with the transformer trip circuits for the groups of disconnecting switches D2 at substation S1 and D3 at substation S2, operation of these breakers at high speed by the exchange current from substation S2 to substation S1 due to bus short circuit may be prevented so as to maintain the feeders in section B energized from the power source. The protective relays controlling the circuit of the holding windings for the feeder disconnecting circuit breakers in group D2 at substation S1 immediately function to produce operation of these circuit breakers to disconnect the short-circuited bus H2 from the feeders. The feeders, however, are maintained energized from the substation S2.

Let us now assume that by some extraordinary coincidence all the feeders B1 to B4 are grounded at precisely the same instant. The possibility of such an event of course is extremely remote as even in the case of a wreck or other accident bringing down all the overhead trolleys in section B, one or two of the trolleys almost inevitably will be short-circuited and the short circuit cleared in one-half cycle by operation of the high speed disconnecting circuit breakers at each end of the feeder before the actual short circuit of the remaining trolleys occurs within such a limited space of time. In the event, however, that all feeders are short-circuited at precisely the same time, for example, midway between the substations S1, S2, the resulting rush of current from the bus at each substation is greater than the exchange current between substations in case of a bus short circuit at either substation. This is due to the fact that the impedance of the circuit with a short circuit midway between the substations is materially less than in the case of a bus short circuit. Consequently, the groups of disconnecting switches D2 and D3 at the respective substations will operate at high speed to immediately disconnect all of the feeders in section B from the source of power.

Likewise, if the short circuit at the same instant on all the feeders occurs directly adjacent one of the substations, say substation S1, the group of disconnecting switches D2 immediately responds to disconnect all feeders from substation S1. In this case the situation, as far as the group of circuit breakers D3 is concerned when the simultaneous short circuit occurs, is substantially the same as in the case of a bus short circuit due to the increased impedance in the feeder circuits with the short circuit adjacent substation S1. Consequently, these breakers initially remain inactive until after the feeders are disconnected from the bus at substation S1. When this occurs the excessive short circuit current in the high voltage lines is reduced and consequently the voltage suddenly increases and thereby produces an increased flow of current to the short-circuited feeder lines from the substation S2. This additional increase of current is sufficient to effect operation of the group of feeder disconnecting switches D3 thereby isolating all of the faulty feeders from the power supply source.

The preferred form of the invention shown in Fig. 2 permits the full advantage of the high speed circuit breaker, as well as the inductive unidirectional transformer trip circuit arrangement therefor covered by my previously mentioned application Serial No. 89,247 to be utilized in a network system to provide high speed selective parallel feeder protection in the manner previously described. However, in case it is not desired to utilize the increase of current principle of my unidirectional transformer trip arrangement, the present invention may be carried into effect by employing any of the ordinary forms of liquid or contact rectifiers for supplying unidirectional tripping current to the high speed circuit breakers in the manner illustrated diagrammatically in Fig. 3.

In general this rectifier trip circuit arrangement is substantially the same as shown in Fig. 2 except that the tripping windings 15, 15a, 15b, 15c, of the corresponding breakers are arranged to be supplied with current in the proper direction to effect release of the circuit breakers through the agency of the current transformers 60, 60a, 60b, 60c, and the cooperating pairs of alternating current to unidirectional current rectifying devices 61, 61a, 61b, 61c, which may be of any desired type. Also in this case the holding windings 14, 14a, 14b, 14c, of the high speed circuit breakers may be energized directly from the direct current supply source indicated as + and − with the holding circuits arranged to be interrupted by the contacts 38, 38a, 38b, 38c, of suitable reverse power, differential, or other forms of protective relays to take care of internal substation faults, as described in connection with the system of Fig. 2. The current transformers 60, 60a, 60b, 60c, are of the usual type employed with rectifiers having a mid tap with the end terminals each connected to one of the pair of cooperating rectifying devices.

In accordance with the present invention, each tripping transformer and cooperating pair of rectifiers are connected to supply the rectified current to the tripping winding of the corresponding circuit breaker in the proper direction to effect release thereof and the transformer and rectifier units and the tripping windings are interconnected in such manner with the resistors R1, R2, R3, R4 and the balancing resistor R5 that the value of abnormal current in any of the feeder lines B1, B2, B3, B4, required to effect simultaneous release of more than one circuit breaker increases proportionately with the number of feeder lines involved. That is, where a certain value of current in each feeder line is required to effect separate release of the corresponding circuit breaker, when two, or more, or all of the feeder lines are at the same instant subjected to an excessive current, the value of current per feeder required to trip each breaker is materially increased.

In order to obtain this result, one side of each of the tripping windings 15, 15a, 15b, 15c, may be connected to an equalizing bus 62 while the mid-point of each of the transformers 60, 60a, 60b, 60c, likewise may be connected to an equalizing bus 63. The other terminals of the tripping windings which are supplied from the common point of each pair of rectifiers are connected to the equalizing bus 63 through the corresponding bypass resistors R1, R2, R3, R4. In addition, the balancing resistor R5 is interconnected between the equalizing busses 62 and 63.

With this modified arangement let us assume that the feeder line B1 is short-circuited. Under these conditions the current transformer 60 supplies current through one of the pair of rectifiers 61 associated therewith during each half cycle in the proper direction to produce tripping of the circuit breaker CB, the return circuit for the rectified tripping current extending from the equalizing bus 62 through each of the tripping windings of the other circuit breakers and the corresponding resistors R2, R3, R4 and the balancing resistor R5 all in multiple circuit relation to the equalizing bus 63 and thence to the mid tap of the current transformer 60. Thus, the return tripping current passes through the tripping windings of the other circuit breakers in the reverse direction and tends to prevent operation of these breakers. In case of separate short circuit on any of the other feeder lines, the current transformer and rectifiers associated therewith supply current in the proper direction in the tripping windings of the corresponding circuit breaker and with the return circuit through all the other tripping windings and resistors in multiple in precisely the same manner.

Thus where more than one feeder develops a short circuit at the same instant, the number of multiple return paths for the tripping current is correspondingly decreased and consequently and increased value of tripping current is required to effect simultaneous release of a plurality of the circuit breakers. In the extraordinary case where all of the feeder lines are simultaneously short-circuited, the tripping current of all the circuit breakers passes through the balancing resistor R5, thereby requiring the maximum value of current per feeder to effect simultaneous release thereof.

By proper adjustment of the resistors R1 to R4 and the balancing resistor R5, it will be evident that the same discriminating action in the case of substation bus circuits may be obtained with the rectified unidirectional trip circuit arrangement shown in Fig. 3 as described in connection with the transformer inductive trip circuit arrangement of Fig. 2. That is, the current required per feeder for simultaneous operation of all the circuit breakers may be made greater than the exchange current between substations, thus preventing operation of the feeder disconnecting circuit breakers in case of bus shorts or other internal faults by the rectifier trip circuits which, however, are at all times capable of taking care of any condition of short circuit on the feeders themselves.

From the foregoing it will be apparent that the present invention enables adequate selective protection of the parallel feeder circuits and substation apparatus to be obtained under practically any condition of fault that may occur in the system and at the same time maintain the feeders energized from the high voltage power source under all possible conditions.

What I claim as new and desire to secure by Letters Patent of the United States, is:

1. In combination, plurality of parallel feeders interconnecting two supply stations therefor, a plurality of feeder disconnecting switches, each having automatic operating means responsive to short circuit fault currents in a corresponding feeder for disconnecting the same from a corresponding one of the supply stations, and automatic electrical means for preventing operation of the feeder disconnecting switches for each station when internal short circuit faults occur at the other station.

2. In combination, a plurality of parallel feeders, a separate circuit breaker for each feeder having automatic operating means normally responsive to predetermined abnormal current conditions therein, and automatic electrical means for insuring the non-response of said automatic operating means for the circuit breakers when said predetermined abnormal current conditions occur simultaneously in the feeders.

3. In combination, a plurality of parallel feeders, a plurality of circuit breakers, each connected to control a corresponding one of said feeders and each having a tripping winding, separate means for operatively energizing the tripping winding of the corresponding circuit breaker in response to abnormal current conditions in the corresponding feeder, and means including electrical connections between said tripping windings and said energizing means for automatically rendering the circuit breakers less responsive to abnormal current conditions upon the simultaneous occurrence of said abnormal current conditions in a plurality of feeders.

4. In combination, a plurality of alternating current feeders, a plurality of switches having unidirectional current responsive operating means therefor, each for controlling a corresponding feeder, a separate alternating to unidirectional current transforming means associated with each feeder for supplying unidirectional energizing current to the operating means of the corresponding switch to effect operation thereof upon the occurrence of abnormal current conditions in the corresponding feeders, said transforming means being differentially interconnected to restrict the unidirectional currents jointly supplied thereby to the operating means of the corresponding switches upon the simultaneous occurrence of abnormal current conditions in more than one of the feeders.

5. In combination, a plurality of alternating current feeders having a common supply source, a plurality of switches, each for disconnecting a corresponding feeder line from the common supply source, and separate unidirectional inductive means for operating each of the switches in response to a predetermined increase of current in the corresponding feeder, said inductive means being differentially interconnected to require a greater simultaneous increase of current in a plurality of the feeders to effect operation of the corresponding switches.

6. In combination, a plurality of circuit breakers, each connected to control a separate circuit, automatic means responsive to predetermined current conditions in each circuit for operating the corresponding circuit breaker, and automatic electrical means for preventing operation of the circuit breakers by said first means when said predetermined current conditions occur simultaneously in the circuits.

7. In combination, a plurality of parallel feeders, a plurality of electrical devices, each having an operating winding, and a plurality of current supply devices therefor, each operable responsively to predetermined conditions in a corresponding feeder and connected in series with the operating winding of a corresponding electrical device, with all the series circuits differentially connected in multiple whereby upon operation of different portions of the current supply devices correspondingly different values of current are supplied to the operating windings of the corresponding electrical devices.

8. In combination, a plurality of parallel feeders, a plurality of electrical devices, each having an operating winding, a plurality of current supply devices therefor each operable responsively to predetermined conditions in a corresponding feeder and connected in series relation with the operating winding of a corresponding electrical device, with all the series circuits differentially interconnected in multiple, and a current regulating device connected in multiple circuit relation with all of said series circuits for varying the value of current supply to the corresponding operating windings upon operation of different portions of the current supply devices.

9. In combination, a plurality of alternating current feeder lines, a plurality of independently operable switches, each connected to control a corresponding feeder line and each having an electroresponsive operating means requiring energization thereof in a predetermined direction to effect operation of the switch, and inductive means associated with each feeder line to be responsive to a rapid increase of current therein and interconnected with the electroresponsive operating means of said switches to supply energization in the said predetermined direction to the operating means of the switch in any feeder line having a rapid increase of current therein and in the reverse direction to the operating means of the remaining switches.

10. In combination, a plurality of alternating current feeders, a plurality of electrical devices, each having an electroresponsive operating means responsive to current in a predetermined direction, a plurality of alternating current to uni-directional current transforming devices, each associated with a corresponding feeder for operation responsively, to predetermined conditions and differential connections extending between the transforming devices and the operating means through which uni-directional current is supplied upon operation of any portion of the transforming devices to a corresponding portion of the operating means in said predetermined direction and to the remainder of said operating means in the opposite direction.

In witness whereof, I have hereunto set my hand this 19th day of June 1928.

JACOB W. McNAIRY.